United States Patent
Simon, III et al.

(10) Patent No.: US 8,691,724 B2
(45) Date of Patent: *Apr. 8, 2014

(54) PREVENTION OF FACE-PLUGGING ON AFTERTREATMENT DEVICES IN EXHAUST

(75) Inventors: Conrad J. Simon, III, Columbus, IN (US); Thomas M. Yonushonis, Columbus, IN (US); Bryan E. Blackwell, Brownsburg, IN (US)

(73) Assignee: Cummins Filtration IP, Inc., Minneapolis, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/602,898

(22) Filed: Sep. 4, 2012

(65) Prior Publication Data

US 2012/0324852 A1    Dec. 27, 2012

Related U.S. Application Data

(63) Continuation of application No. 11/772,619, filed on Jul. 2, 2007, now Pat. No. 8,257,659.

(51) Int. Cl.
*B01J 37/02* (2006.01)
*B01J 35/10* (2006.01)

(52) U.S. Cl.
USPC ............. 502/439; 55/524; 422/180; 422/222

(58) Field of Classification Search
USPC ........... 422/176, 177, 180, 211, 222; 55/523, 55/524, 529, DIG. 30; 428/116; 502/439, 502/527.23; 29/890
See application file for complete search history.

(56) References Cited

U.S. PATENT DOCUMENTS

| | | | |
|---|---|---|---|
| 3,755,204 A | | 8/1973 | Sergeys |
| 3,804,647 A | * | 4/1974 | Elmer et al. ............... 501/39 |
| 3,910,850 A | * | 10/1975 | Turner ..................... 422/177 |
| 4,329,162 A | | 5/1982 | Pitcher, Jr. |
| 5,089,237 A | | 2/1992 | Schuster et al. |

(Continued)

FOREIGN PATENT DOCUMENTS

| | | |
|---|---|---|
| JP | S49-17851-01 | 5/1947 |
| JP | S 52-97383 | 8/1977 |

(Continued)

OTHER PUBLICATIONS

International Preliminary Report on Patentability of PCT/US2008/064687, dated Jan. 5, 2010.

(Continued)

*Primary Examiner* — Jill Warden
*Assistant Examiner* — Joye L Woodard
(74) *Attorney, Agent, or Firm* — Krieg DeVault LLP

(57) ABSTRACT

An inlet face for an aftertreatment device that prevents and/or eliminates face-plugging for a passageway where the inlet face is disposed. The inlet face includes a particular end surface disposed on an outer surface at the end of a substrate. The end surface includes at least one of a three-dimensional topographical configuration disposed at the end of the substrate, a chemical coating applied on the end of the substrate, or both a three-dimensional topographical configuration disposed on the end of the substrate and a chemical coating applied on the three-dimensional topographical configuration. As one example, the inlet face can be helpful in preventing carbonaceous fouling, which can result from engine exhaust material, such as carbon soot and other engine exhaust by-products.

17 Claims, 20 Drawing Sheets

(56) References Cited

U.S. PATENT DOCUMENTS

| | | | |
|---|---|---|---|
| 5,248,251 A | 9/1993 | Dalla Betta et al. | |
| 5,330,720 A | 7/1994 | Sorbo et al. | |
| 5,330,728 A | 7/1994 | Foster | |
| 5,525,307 A | 6/1996 | Yasaki et al. | |
| 5,866,210 A * | 2/1999 | Rosynsky et al. | 427/294 |
| 8,257,659 B2 * | 9/2012 | Simon et al. | 422/180 |
| 2005/0274096 A1 | 12/2005 | Yamada et al. | |
| 2006/0057046 A1 * | 3/2006 | Punke et al. | 422/177 |
| 2009/0118121 A1 | 5/2009 | Sarai | |

FOREIGN PATENT DOCUMENTS

| | | |
|---|---|---|
| JP | H 10-118500 | 5/1998 |
| JP | 2002309922 | 10/2002 |
| JP | 2005-106022 | 4/2005 |
| JP | 2005-194928 | 7/2005 |
| JP | 2007054751 | 3/2007 |
| JP | 2007-260618 | 10/2007 |
| WO | WO9934906 | 7/1999 |

OTHER PUBLICATIONS

Heibel et al., "A New Converter Concept Providing Improved Flow Distribution and Space Utilization." Society of Automotive Engineers, Inc., 1999, pp. 57-66.

International Search Report and Written Opinion of the International Searching Authority of PCT/US2008/064687, dated Nov. 26, 2008.

* cited by examiner

PREVENTION OF FACE-PLUGGING ON AFTERTREATMENT DEVICES IN EXHAUST

CROSS-REFERENCE TO RELATED APPLICATION

The present application is a continuation of U.S. patent application Ser. No. 11/772,619 filed on Jul. 2, 2007 now U.S. Pat. No. 8,257,659, which is incorporated herein by reference.

FIELD

An inlet face is disclosed that prevents and/or eliminates face-plugging in a fluid passageway. As one example, an inlet face is provided that is particularly helpful for various aftertreatment devices, so as to prevent and/or eliminate carbonaceous fouling and/or the accumulation of unburned hydrocarbons, which may be deposited on the inlet face of such aftertreatment devices from exhaust material, such as from internal combustion engine exhaust. An inlet face as disclosed herein can thereby prevent backpressure increase in an engine exhaust system.

BACKGROUND

Catalyzed and uncatalyzed aftertreatment devices, are well known and widely used in various internal combustion engine applications for the aftertreatment of engine exhaust gases. For example, aftertreatment devices are useful for handling and/or removing exhaust materials, such as carbon monoxide, nitric oxide, unburned hydrocarbons and soot, in the exhaust stream of an engine.

Although particulate filters are sometimes not catalyzed on the interior surfaces, many aftertreatment devices commonly employ a catalyzed washcoat applied to interior surfaces within fluid passageways of a cellular structure, which often resembles an interior of a honeycomb structure. Undesired exhaust material(s) react upon the catalyst material of the catalyzed washcoat, thus diminishing the undesired exhaust material(s).

However, face-plugging of the fluid passageways at the inlet face of these aftertreatment devices continues to be an issue under certain operating conditions. As one specific example, such problematic operating conditions can occur when a diesel engine operates during less aggressive duty cycles, such as but not limited to, extended idling operation. Frequent start and stop operation and other transient operating conditions can also be problematic. Furthermore, face-plugging has been known to occur at the inlet face of aftertreatment devices, such as those used in diesel engine aftertreatment applications during cold ambient operating temperatures, or during relatively low exhaust temperature ranges, such as 220° C. to 400° C. Such face-plugging or fouling at the inlet face has been defined as residue, such as exhaust materials and/or soot particles that accumulates on the outer surface of the cellular structure at the inlet face of an aftertreatment device, and effectively reduces the open frontal area of the aftertreatment device. Face-plugging is problematic, because it can result in a sharp rise in backpressure in aftertreatment or exhaust systems, which in turn may affect engine operation and decrease system efficiency. Preventing the formation of the soot/coke deposits during such problematic operating conditions would be of benefit. Thus, there is a need to provide an improved inlet face that can prevent and/or eliminate face-plugging or fouling at the inlet face aftertreatment devices.

SUMMARY

The following technical disclosure provides an improved inlet face, such as for an inlet of an aftertreatment device. One benefit is that the improved inlet face can prevent and/or eliminate face-plugging on the inlet of an aftertreatment device, such as by preventing and/or eliminating carbonaceous fouling and/or the accumulation of unburned hydrocarbons which may be deposited on the inlet of an aftertreatment device from exhaust material.

In one embodiment, an inlet face includes a substrate having an end with a cellular structure configured to enable fluid flow through the substrate. An end surface is disposed on the end of the substrate that is configured to prevent and/or eliminate face-plugging at the end of the substrate and on surfaces of its cellular structure that are located at the end of the substrate.

In one embodiment, the inlet face includes a three-dimensional topographical configuration such that the outer surface of the substrate is non-planar.

In another embodiment, the inlet face includes a chemical coating applied on the outer surface of the cellular structure of the substrate. In one embodiment, the chemical coating is a catalytic coating.

In another embodiment, the inlet face includes both a three-dimensional topographical configuration and a chemical coating applied on the three-dimensional topographical configuration.

DETAILED DESCRIPTION

Generally, an inlet face is described that can prevent and/or eliminate face-plugging of a fluid passageway where the inlet face is disposed. The inlet face includes a particular outer end surface disposed at the end of a substrate. The end surface provided on the substrate can prevent and/or eliminate face-plugging on the inlet face. As one example, the inlet face can be helpful in preventing and/or eliminating carbonaceous fouling and/or the accumulation of unburned hydrocarbons on the inlet face, which are deposited from engine exhaust material, for example, the exhaust from an internal combustion engine.

In one embodiment, an inlet face for a fluid passageway includes a substrate with a cellular structure configured to enable fluid flow through the substrate. An outer end surface configuration is disposed on the cellular structure of the substrate and at the end of substrate. The end surface is configured to prevent and/or eliminate face-plugging on at the end of the substrate and cellular structure. In particular, the end surface provides a configuration that can prevent, or at least minimize, residue from being deposited on the substrate and particularly the walls and edge surfaces of the cellular structure that are located at the end of the substrate. The end surface is at least one of a three-dimensional topographical configuration disposed on the end of the substrate, a chemical coating disposed on the end of the substrate, or both a three-dimensional topographical configuration disposed on the end of the substrate and a chemical coating disposed on the three-dimensional topographical configuration.

Three-Dimensional Topographical Configuration of an Inlet Face

In one embodiment, the end surface is a three-dimensional topographical configuration disposed at the end of the substrate, such that the end of the substrate has an overall non-planar surface. That is, the three-dimensional topographical configuration is configured such that the end of the substrate has a profile that does not reside in an entirely single plane.

FIGS. 1-4 and 6-17 illustrate exemplary embodiments for a three-dimensional, topographical surface configuration of an inlet face. As shown, the inlet face is particularly useful when employed for example, on the inlet side of an aftertreatment device.

Figure 1:
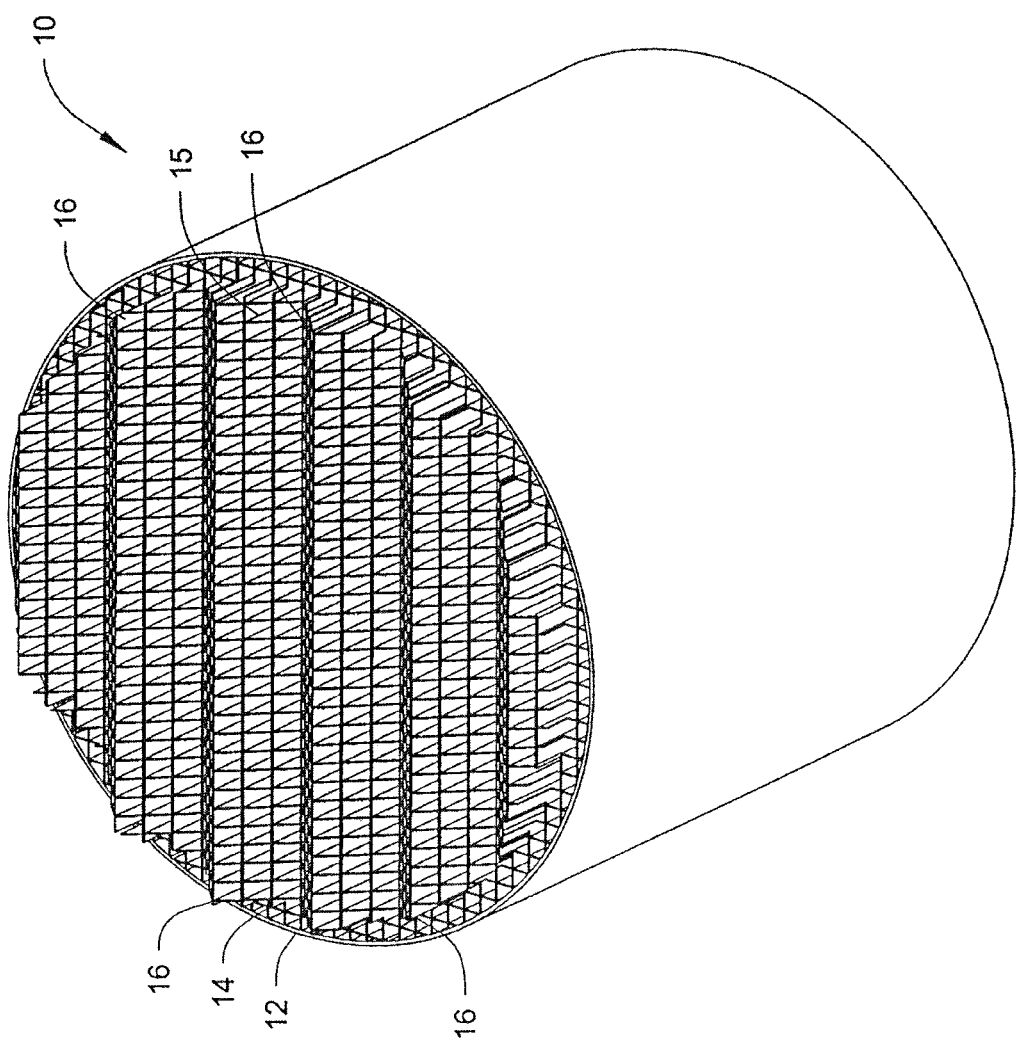
FIG. 1 illustrates a perspective view of one embodiment of an inlet face for an aftertreatment device.
Figure 2:
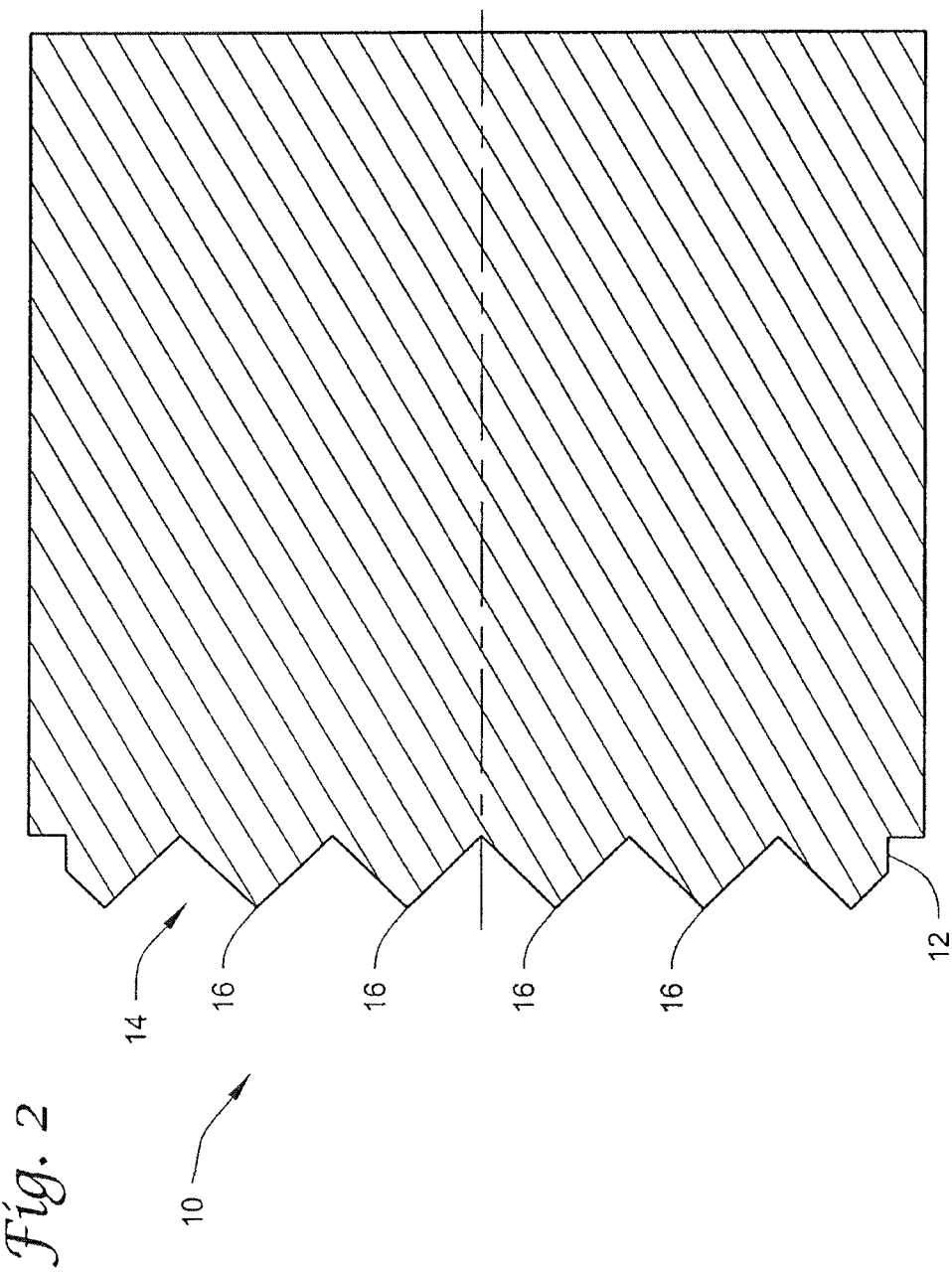
FIG. 2 illustrates a side sectional view of the inlet face of FIG. 1.

FIGS. 1 and 2 show an inlet face 10 of an aftertreatment device. The inlet face 10 includes an outer end surface 14 provided with one embodiment of a three-dimensional topographical configuration. As shown, the inlet face 10 is incorporated at an inlet side of a diesel oxidation catalyst (DOC). It will be appreciated, however, that the inlet face 10 shown may be suitably modified as necessary to be employed in other aftertreatment devices. Such other aftertreatment devices include, but are not limited to, other flow-through devices with catalytic elements like a DOC, such as a close-coupled catalyst (CCC). Other non-limiting examples of aftertreatment devices in which the described inlet face 10 may be employed can include an $NO_x$ adsorber catalyst (NAC), a selective catalytic reduction (SCR) catalyst, a catalyzed soot filter (CSF), or a diesel particulate filter (DPF) or soot collector.

It will be appreciated that the inventive concepts of the inlet faces described herein may be sized and dimensioned as necessary to accommodate the inlets of such other aftertreatment devices both mentioned and not mentioned. It further will be appreciated that the inlet face 10 may be suitably modified to be used as an outlet face on an outlet side of various aftertreatment devices, such as the outlet side of any of the aftertreatment devices mentioned.

As shown in FIG. 1, the outer end surface 14 is disposed at an outer end of the substrate 12. The substrate 14 includes a cellular structure 15, resembling a honeycomb-like configuration. The cellular structure 15 is configured to enable fluid flow through the substrate 12 and includes a plurality of cells (details discussed below in FIG. 5). The term "fluid" is meant to be construed broadly to include any medium that can be made to flow. As some examples only, the fluid material(s) may include, but are not limited to, any exhaust material or any material containing soot from a processed material. As other examples, the fluid material(s) include any material that may produce and/or leave a residue. A residue is meant to be any material that may be dried and left on the cellular structure of the substrate, or may be a "wet" material that has been not been completely burned and left on the cellular structure of the substrate. As one example of residue is carbonaceous fouling and/or the accumulation of unburned hydrocarbons from exhaust material, which may be deposited on the inlet of an aftertreatment device.

The end surface 14 is disposed on an outer surface of the substrate 12 at the end. As shown, the end surface 14 is a three-dimensional topographical configuration having a non-planar or fractured arrangement. That is, the end surface 14 does not reside entirely in the same overall plane, such as when viewed from its profile. (See FIG. 2.) The end surface 14 includes multiple adjacent and parallel rows 16 disposed on the substrate 12. As one example only, FIG. 2 shows that the parallel rows 16 resemble v-shaped rows and may have a 90° included angle. It will be appreciated that the v-shaped rows may be arranged at angles less than or greater than 90°, as long as the overall arrangement of the end surface 14 does not reside on entirely the same plane.

Figure 3:
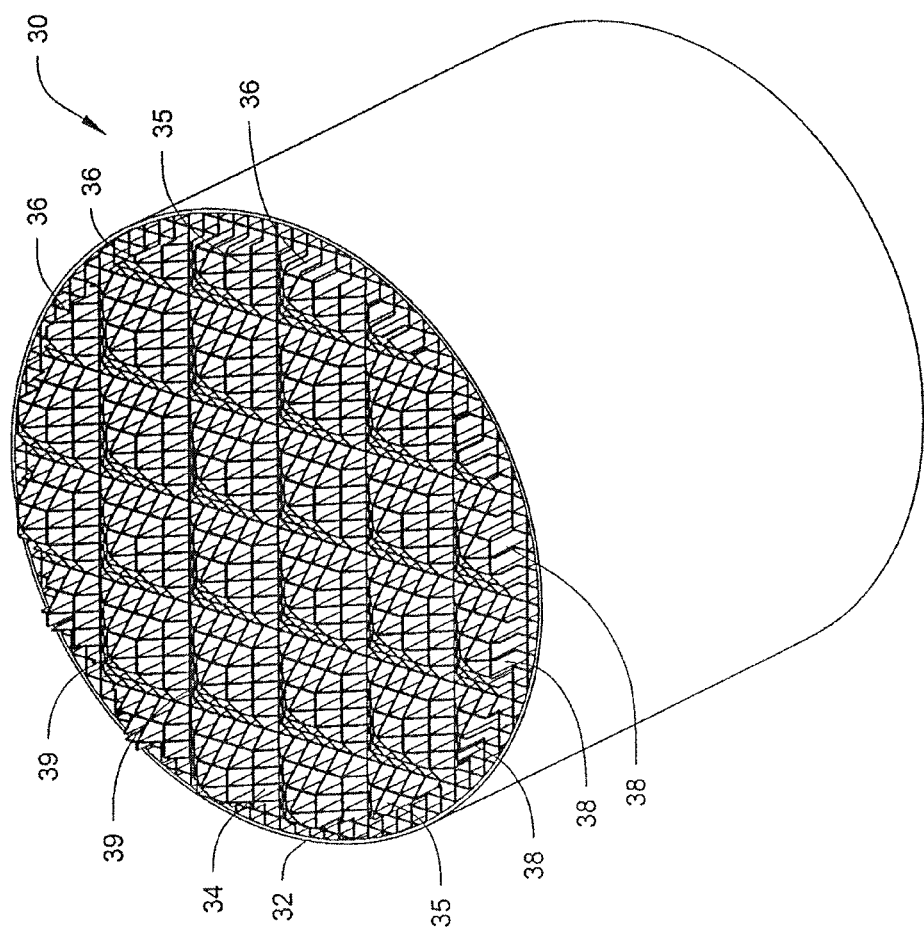
FIG. 3 illustrates a perspective view of another embodiment of an inlet face for an aftertreatment device.
Figure 4:
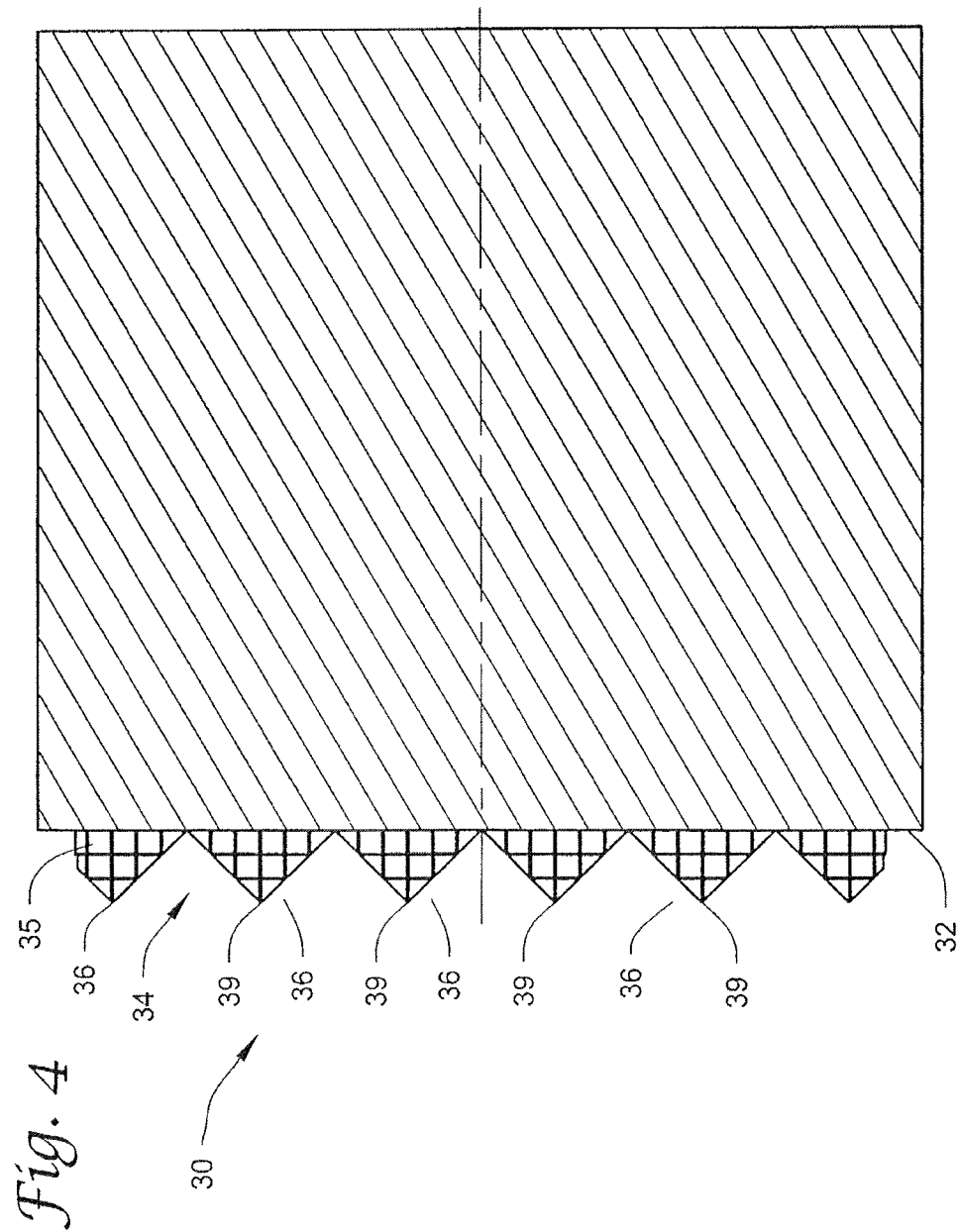
FIG. 4 illustrates a side sectional view of the inlet face of FIG. 3.

FIGS. 3-4 show another exemplary embodiment of an inlet face 30 of an aftertreatment device. The inlet face 30 provides another exemplary end surface 34 with a three-dimensional topographical configuration. As with inlet face 10, the inlet face 30 is for a diesel oxidation catalyst (DOC). It will be appreciated, however, that the inlet face 30 shown may be suitably modified as necessary to be employed in other aftertreatment devices. Such other aftertreatment devices include, but are not limited to, other flow through aftertreatment devices like a DOC, such as a close-coupled catalyst (CCC). Other non-limiting examples of aftertreatment devices in which the described inlet face 30 may be employed can include an $NO_x$ adsorber catalyst (NAC), a selective catalytic reduction (SCR) catalyst, a catalyzed soot filter (CSF), or a diesel particulate filter (DPF) or soot collector.

It will be appreciated that the inventive concepts of the inlet faces described herein may be sized and dimensioned as necessary to accommodate the inlets of such other aftertreatment devices. It further will be appreciated that the inlet face 30 may be suitably modified to be used as an outlet face at the outlet side of various aftertreatment devices, for example in outlets of any of the aftertreatment devices mentioned.

The inlet face 30 includes the end surface 34 disposed on an outer end surface of the substrate 32 having a cellular structure 35. The cellular structure 35 is configured to enable fluid flow through the substrate 12 and includes a plurality of cells (details discussed below in FIG. 5). As with inlet 10, the term "fluid" is meant to be construed broadly to include any medium that can be made to flow. In some examples only, the fluid material(s) may include, but are not limited to, any exhaust material or any material containing soot from a processed material. As other examples, the fluid material(s) can include any material that may produce a residue that is left on the cellular surface of the substrate.

The end surface 34 is disposed on an outer surface of the substrate 32 and at the end. The end surface 34 also is a three-dimensional topographical configuration having a non-planar or fractured arrangement. As with surface 14, the end surface 34 does not reside in entirely the same overall plane, such as when viewed from its profile.

Differently from end surface 14, the end surface 34 includes a pyramid-like configuration resulting from the intersection of parallel v-shaped rows. As shown, the end surface 34 includes a first set of multiple rows 36 disposed on the substrate 32. The first rows 36 are adjacent and parallel to each other and resemble v-shaped rows. As one example only, FIG. 4 shows that the first rows 36 may have a 90° included angle. (See FIG. 4.) It will be appreciated that the v-shaped rows may be arranged at angles less than or greater than 90°, as long as the overall arrangement of the surface 34 does not reside in an overall same plane.

The end surface 34 further includes a second set of multiple rows 38 disposed on the substrate 32 that are adjacent and parallel to each other. As with the first rows 36, the second rows 38 resemble v-shaped rows and may have a 90° included angle. It also will be appreciated that the v-shaped rows may be arranged at angles less than or greater than 90°, so long as the overall arrangement of the surface 34 does not reside in an overall same plane.

As shown, the second rows 38 are orthogonal to the first rows 36. Thus, four-sided pyramid-like structures 39 are formed by the 90° intersection of first and second parallel rows 36, 38. It will be appreciated that the arrangement of the first rows 36 and the second rows 38 are not limited to the specific orthogonal relationship shown, and that the first and second rows 36, 38 may intersect at angles other than 90°.

It further will be appreciated that an inlet face is not limited to the specific arrangements shown in FIGS. 1-4. FIGS. 1-4 show exemplary configurations only, where the inlet includes an end surface having a three-dimensional topographical configuration that may be, but is not limited to, parallel V-shaped rows or two sets of intersecting v-shaped rows. It will be appreciated that the described end surfaces (i.e. 14, 34) for an inlet face may be suitably modified and may have other configurations, as long as the end surface can create exhaust flow turbulence and shear so as to minimize soot and/or exhaust material adherence, can prevent and/or eliminate face-plugging.

As shown, the cellular structure (i.e. 15, 35) extends through an outer surface and at the end of the substrate (i.e. 12, 32). In one example of an aftertreatment device, such as a flow-through DOC, the cellular structure leads into channels that extend through the entire substrate from the inlet side (where inlet face 10, 30 are disposed) to the outlet side. It will be appreciated that the cellular structure may be employed in other aftertreatment devices, such as a DPF, that do not have flow-through channels but includes an inlet face of a single channel at the inlet side, and where a network of openings or pores lead into multiple outlet channels to the outlet side.

The cellular structure defines separate cells that have inner sidewalls and wall edges (see FIGS. 1 and 3). The cells are configured such that they are adjacent of each other, and are disposed substantially about the inlet face. As some examples only, an inlet face may include about 100 to about 900 cells per square inch thereon.

In one embodiment, the inner sidewalls of each cell may include a first pair of parallel walls and a second pair of parallel walls orthogonal to the first pair of parallel walls. It will be appreciated the orthogonal configuration of the first pair of parallel walls with the second pair of parallel walls is merely exemplary, as the relationship between the first and second pair of parallel walls may be arranged such that they not orthogonal or perpendicular to each other.

Figure 5:
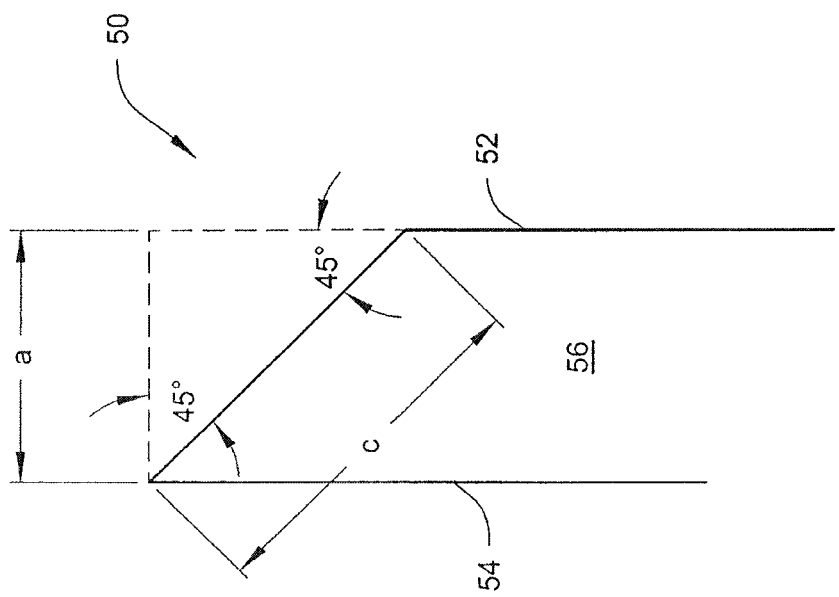
FIG. 5 illustrates a partial schematic view of one embodiment of an end surface for an end of a substrate of an aftertreatment device and particularly showing a side of a single cell of the end surface.

FIG. 5 further illustrates an exemplary cellular structure for an inlet face. FIG. 5 shows a partial cellular structure and particularly depicting a single cell 50, such as when a three-dimensional topographical surface is present. It will be appreciated that the principle shown in FIG. 5 may applicable to any of the inlet faces described herein that have multiple cells in their cellular structures. Each cell 50 includes a first pair of parallel walls 53 and a second pair of parallel walls 54. For example, the v-shaped rows or pyramid-like shapes of an inlet face (i.e. 10, 30) can produce an end surface which has a significantly increased cell dimension at the end of the substrate, and that effectively serves to increase the distance between at least one of the two pairs of parallel walls 52, 54 for each cell 50 at the inlet face. Thus, the distance required for fouling (i.e. carbonaceous fouling) to be bridged is increased, because the distance between the outer ends of at least one of the pairs of parallel walls is increased.

As shown, the cell 50 has one pair of sidewalls 52, 54 orthogonal to sidewall 56. The sidewall 54 has a larger dimension than sidewall 52, so as to create an increased cell dimension "c," such as at a 45° angle, versus a conventional cell configuration of an inlet substrate having even sidewalls with a planar dimension "a" (shown in dashed line). As an example, by the Pythagorean Theorem, the dimension "c" will be approximately 41% longer than the dimension "a" at a 45° angle. It will be appreciated that the increased cell dimension is not limited to the 45° angle shown, and may include an angle of higher or lesser degree, so long as the increased cell dimension is created in one of the walls of one pair of parallel walls.

Thus, applying the principle illustrated in FIG. 5, at least one of the first or second pairs of parallel walls includes a first wall and a second wall (i.e. 52, 54), where one of the first or second walls has a larger dimension, and extending further outwardly from the end of the substrate, than the other of the first or second wall. In this configuration, the distance between the outer ends of the first and second walls of one pair of the parallel walls is larger than a distance between the first and second walls of the other pair of parallel walls.

Figure 6:
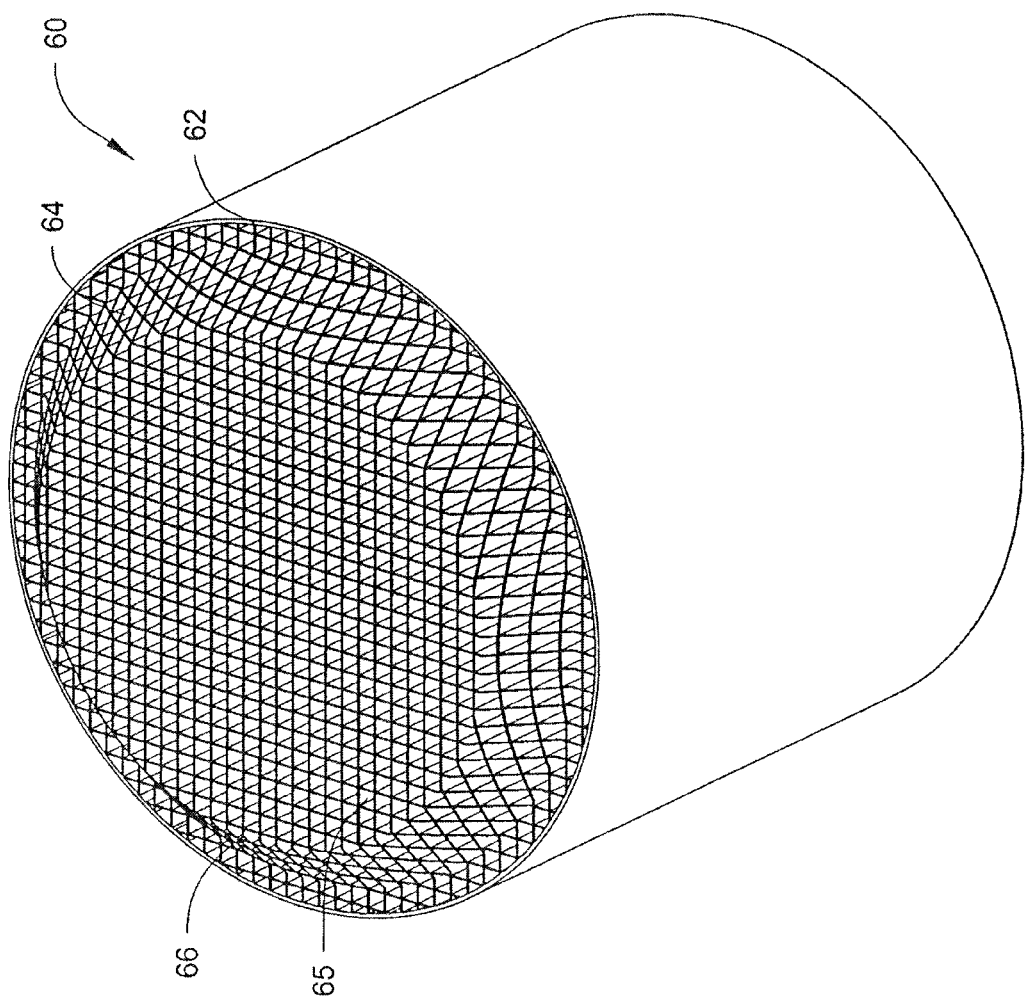
FIG. 6 illustrates a perspective view of another embodiment of an inlet face for an aftertreatment device.
Figure 7:
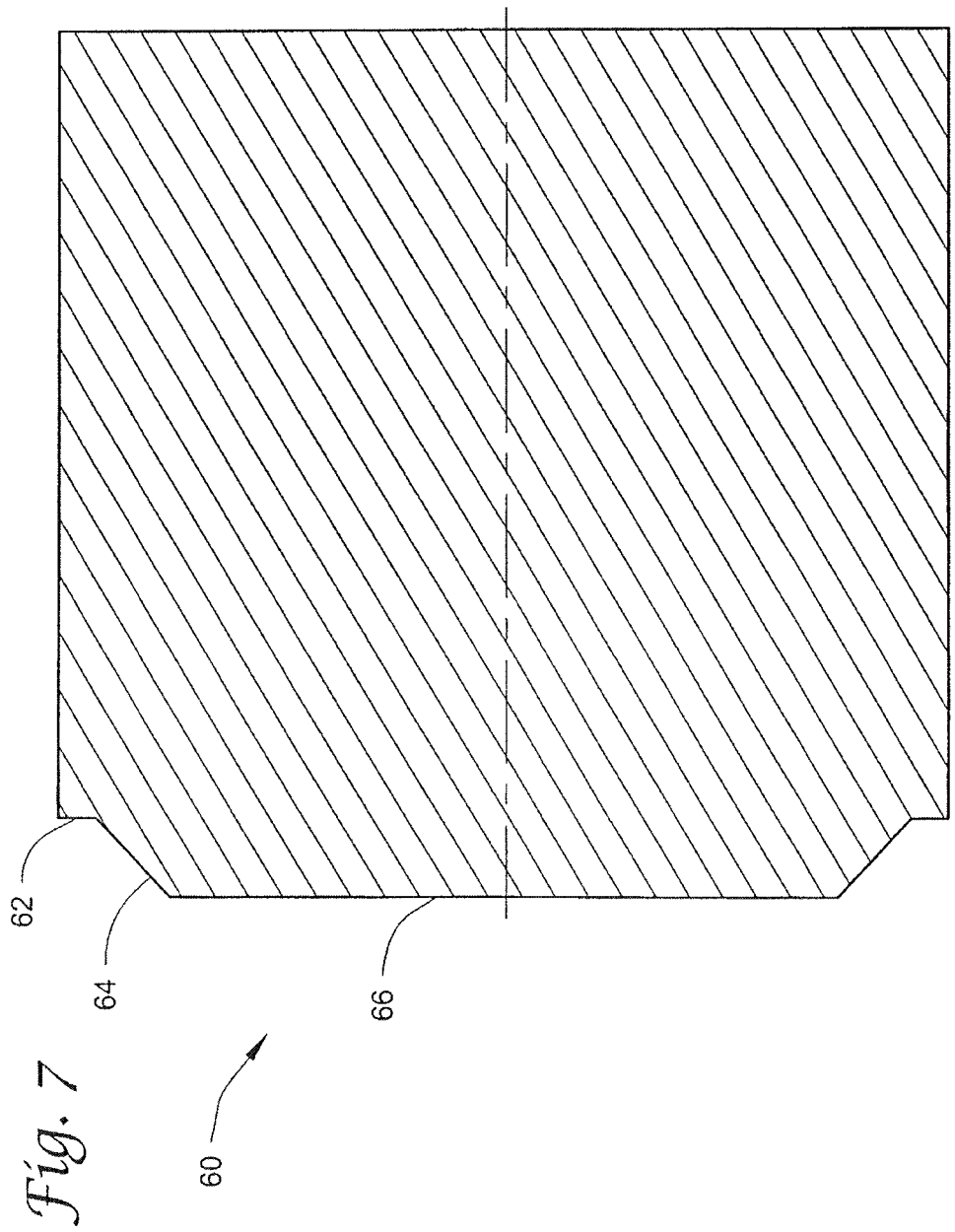
FIG. 7 illustrates a side sectional view of the inlet face of FIG. 6.

FIGS. 6-17 illustrate other examples of three-dimensional topographical configurations for an inlet face. FIGS. 6-7 show an inlet face 60 having an end surface 64 disposed on a substrate 62 at the inlet side of an aftertreatment device, such as a DOC. The end surface 64 is outwardly bossed and resembles a convex "cupped" type 66 flow-through aftertreatment device. As with the inlet faces 10, 30, the inlet face 60 does not reside in the same plane. Rather, the end surface 64 is non-planar or has a somewhat fractured arrangement. That is, the end surface 64 does not reside entirely in the same overall plane, such as when viewed from its profile. (See for example FIG. 7.) The inlet face 60 also includes a cellular structure 65 with multiple cells. As with the cellular structures 15, 35 of inlet faces 10, 30, it will be appreciated that the cellular structure 65 of inlet face 60 may incorporate increased cell dimension principles as described above in FIG. 5. It further will be appreciated that the inlet face 60 may be employed in various aftertreatment devices other than a DOC.

Figure 8:
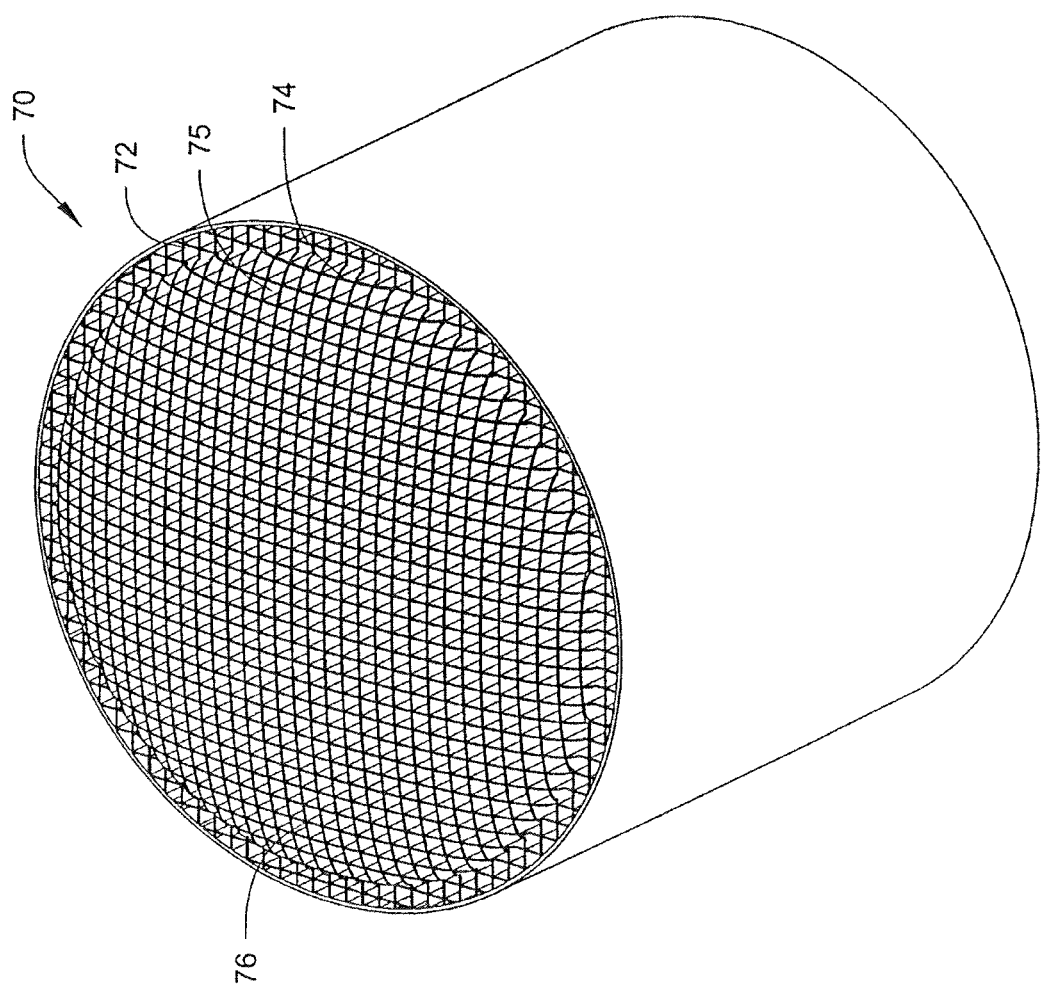
FIG. 8 illustrates a perspective view of another embodiment of an inlet face for an aftertreatment device.
Figure 9:
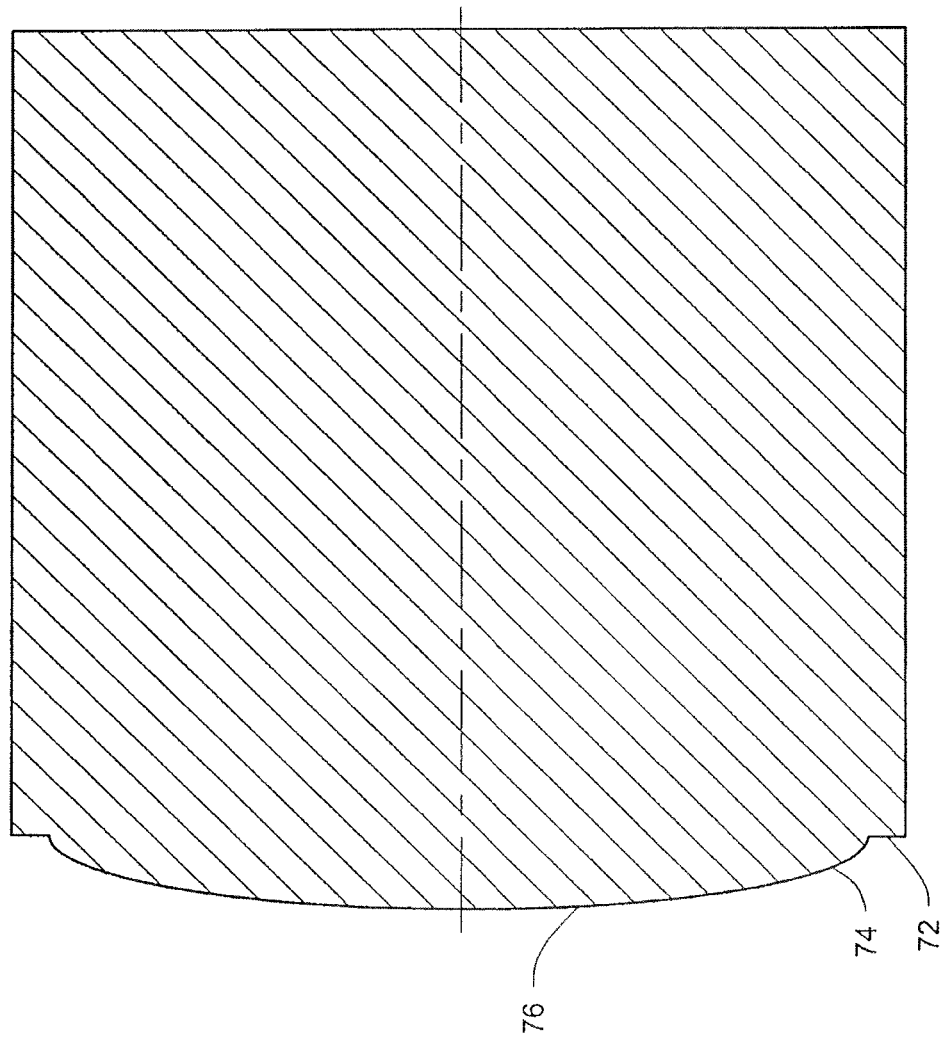
FIG. 9 illustrates a side sectional view of the inlet face of FIG. 8.

FIGS. 8-9 show an inlet face 70 having an end surface 74 disposed on a substrate 72 at the inlet side of an aftertreatment device, such as a DOC. The end surface 74 extends outwardly and resembles a convex parabolic type flow-through 76 aftertreatment device. As with the other inlet faces described, the inlet face 70 does not reside in the same plane. Rather, the end surface 74 is non-planar and has a somewhat fractured arrangement. That is, the end surface 74 does not reside entirely in the same overall plane, such as when viewed from its profile. (See for example FIG. 9.) The inlet face 70 also includes a cellular structure 75 with multiple cells. As with the other cellular structures described, it will be appreciated the cellular structure 75 of inlet face 70 may also incorporate increased cell dimension principles as described above in FIG. 5. It further will be appreciated that the inlet face 70 may be employed in various aftertreatment devices other than a DOC.

Figure 10:
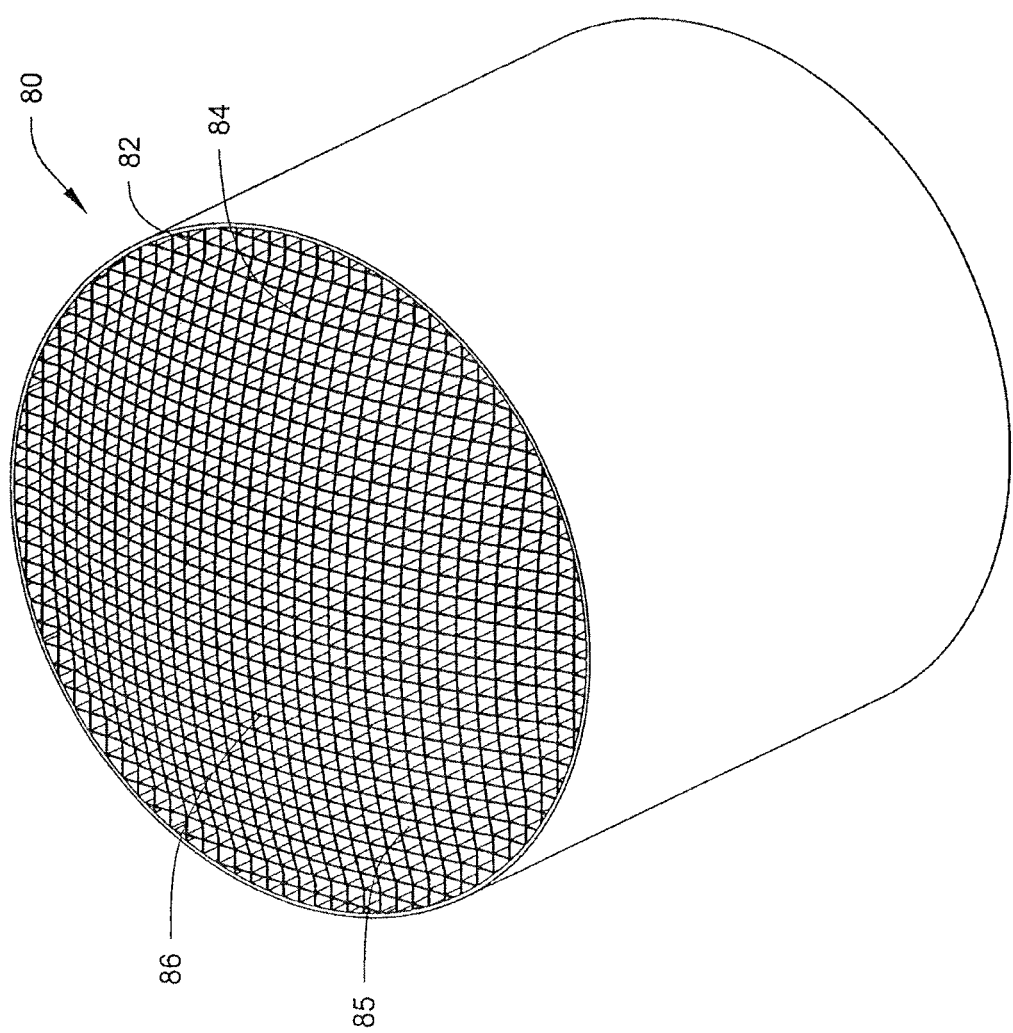
FIG. 10 illustrates a perspective view of another embodiment of an inlet face for an aftertreatment device.
Figure 11:
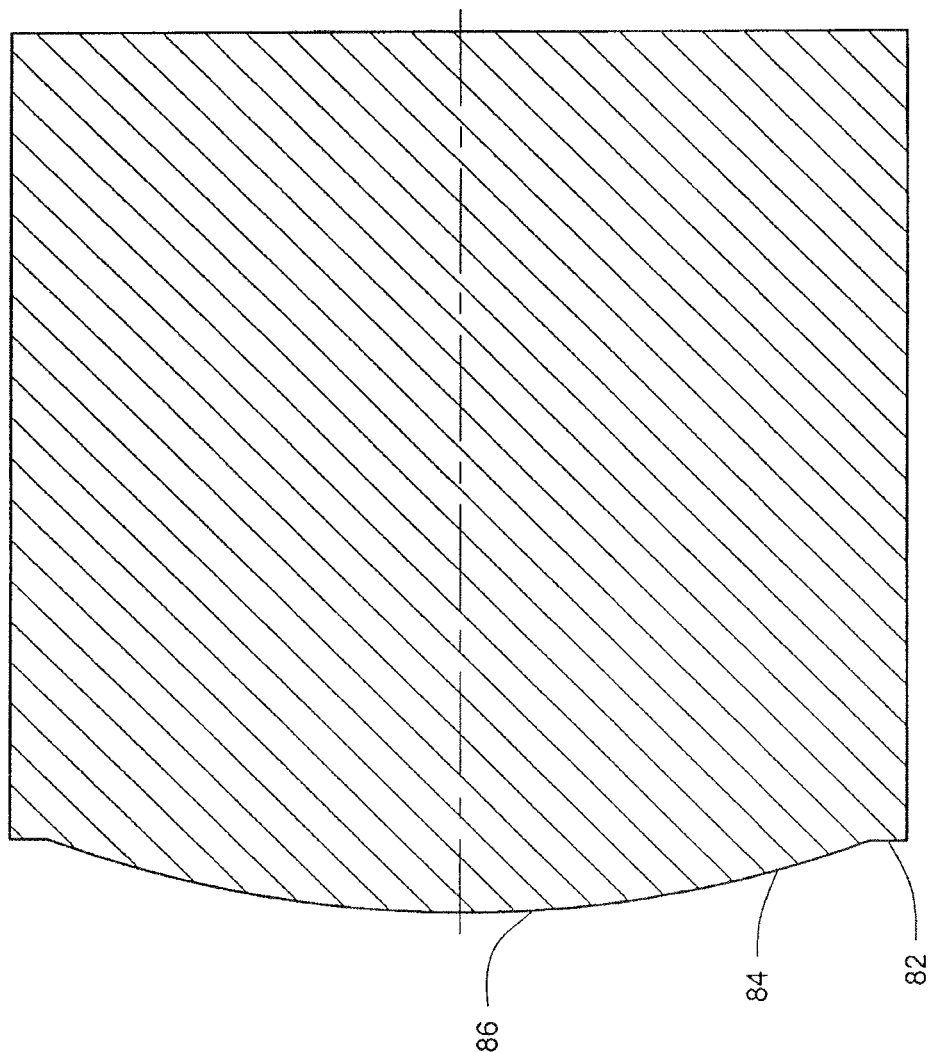
FIG. 11 illustrates a side sectional view of the inlet face of FIG. 10.

FIGS. 10-11 show an inlet face 80 having an end surface 84 disposed on a substrate 82 at the inlet side of an aftertreatment device, such as a DOC. The end surface 84 extends outwardly and resembles a convex rounded type flow-through 86 aftertreatment device. As with the other inlet faces described, the inlet face 80 does not reside in the same plane. Rather, the end surface 84 is non-planar and has a somewhat fractured arrangement. That is, the end surface 84 does not reside entirely in the same overall plane, such as when viewed from its profile. (See for example FIG. 11.) The inlet face 80 also includes a cellular structure 85 with multiple cells. As with the other cellular structures described, it will be appreciated the cellular structure 85 of inlet face 80 may also incorporate increased cell dimension principles as described. It further will be appreciated that the inlet face 80 may be employed in various aftertreatment devices other than a DOC.

Figure 12:
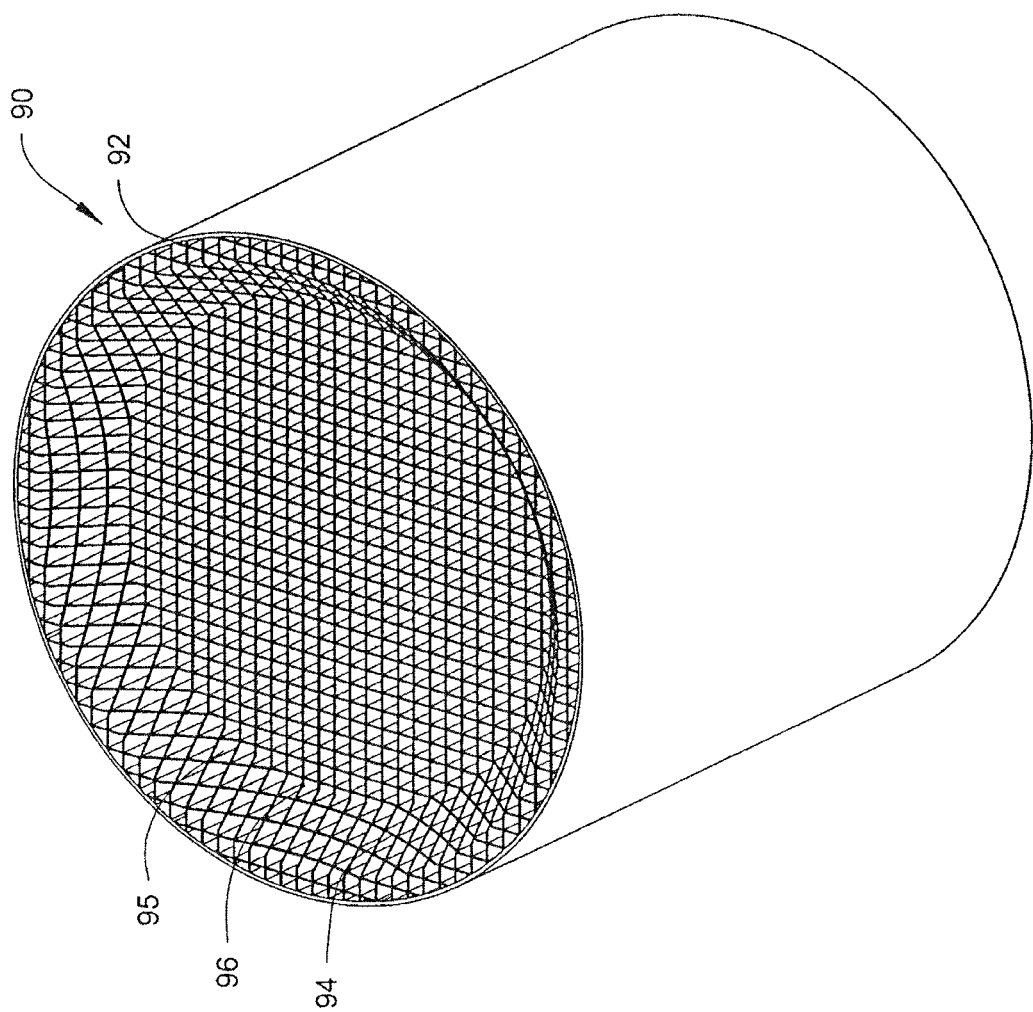
FIG. 12 illustrates a perspective view of yet another embodiment of an inlet face for an aftertreatment device.
Figure 13:
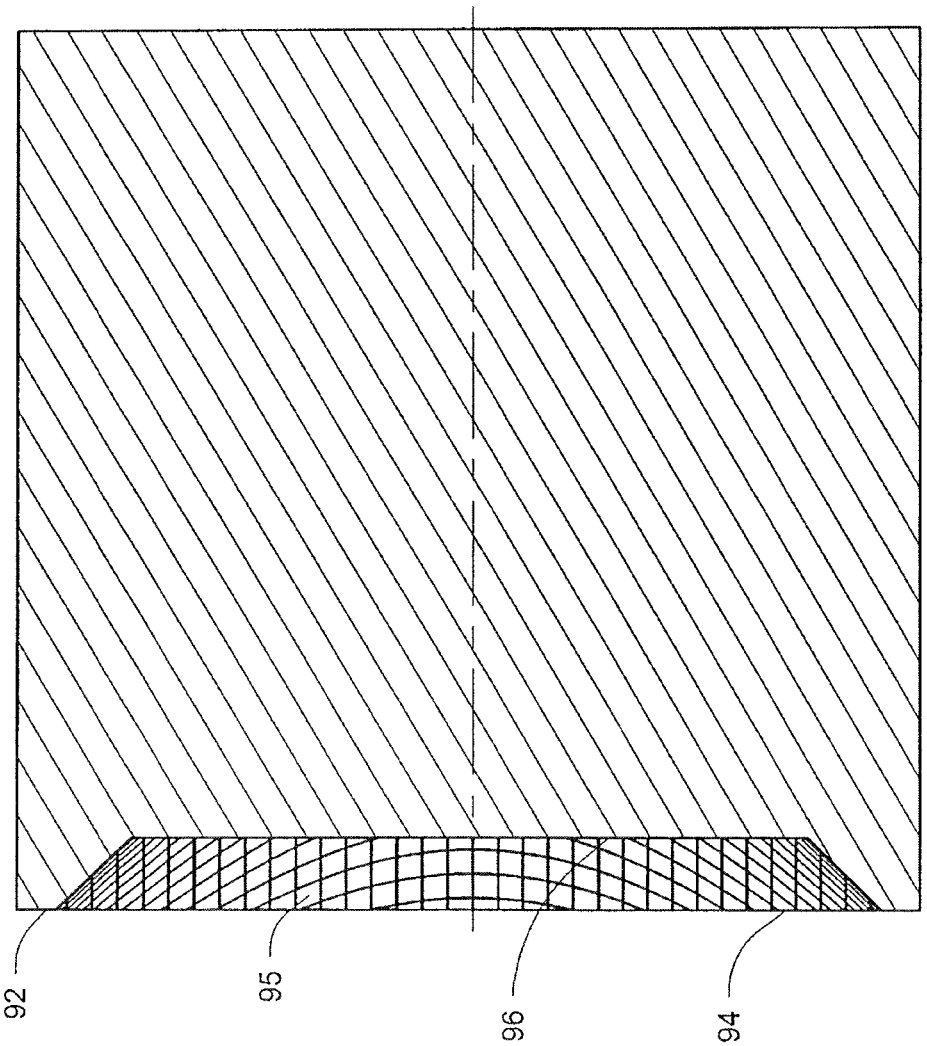
FIG. 13 illustrates a side sectional view of the inlet face of FIG. 12.

FIGS. 12-13 show an inlet face 90 having an end surface 94 disposed on a substrate 92 at the inlet side of aftertreatment device, such as a DOC. The end surface 94 extends inwardly and resembles a concave depressed or "cupped" type flow-through 96 aftertreatment device. As with the other inlet faces described, the inlet face 90 does not reside in the same plane. Rather, the end surface 94 is non-planar and has a somewhat fractured arrangement. That is, the end surface 94 does not reside entirely in the same overall plane, such as when viewed from its profile. (See for example FIG. 13.) The inlet face 90 also includes a cellular structure 95 with multiple cells. As with the other cellular structures described, it will be appreciated the cellular structure 95 of inlet face 90 may also incorporate increased cell dimension principles as described. It further will be appreciated that the inlet face 90 may be employed in various aftertreatment devices other than a DOC.

Figure 14:
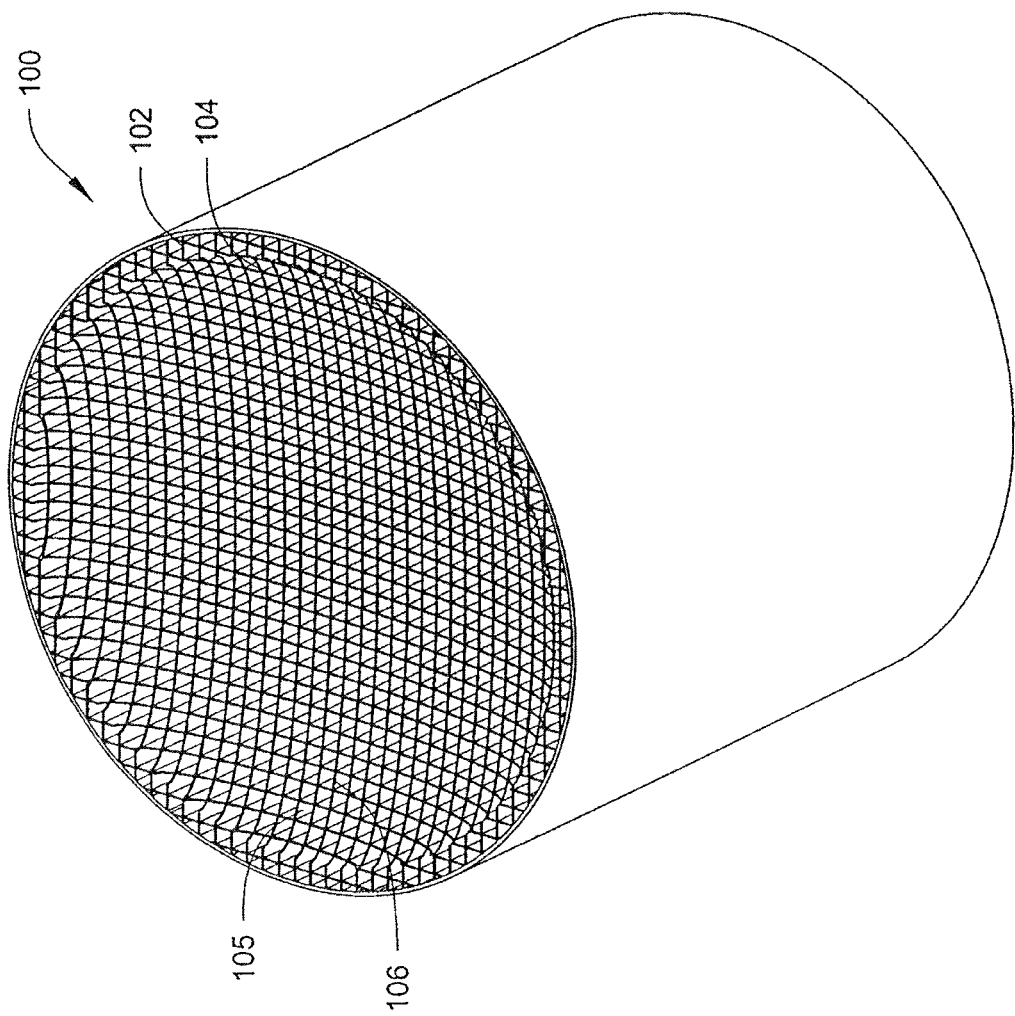
FIG. 14 illustrates a perspective view of yet another embodiment of an inlet face for an aftertreatment device.
Figure 15:
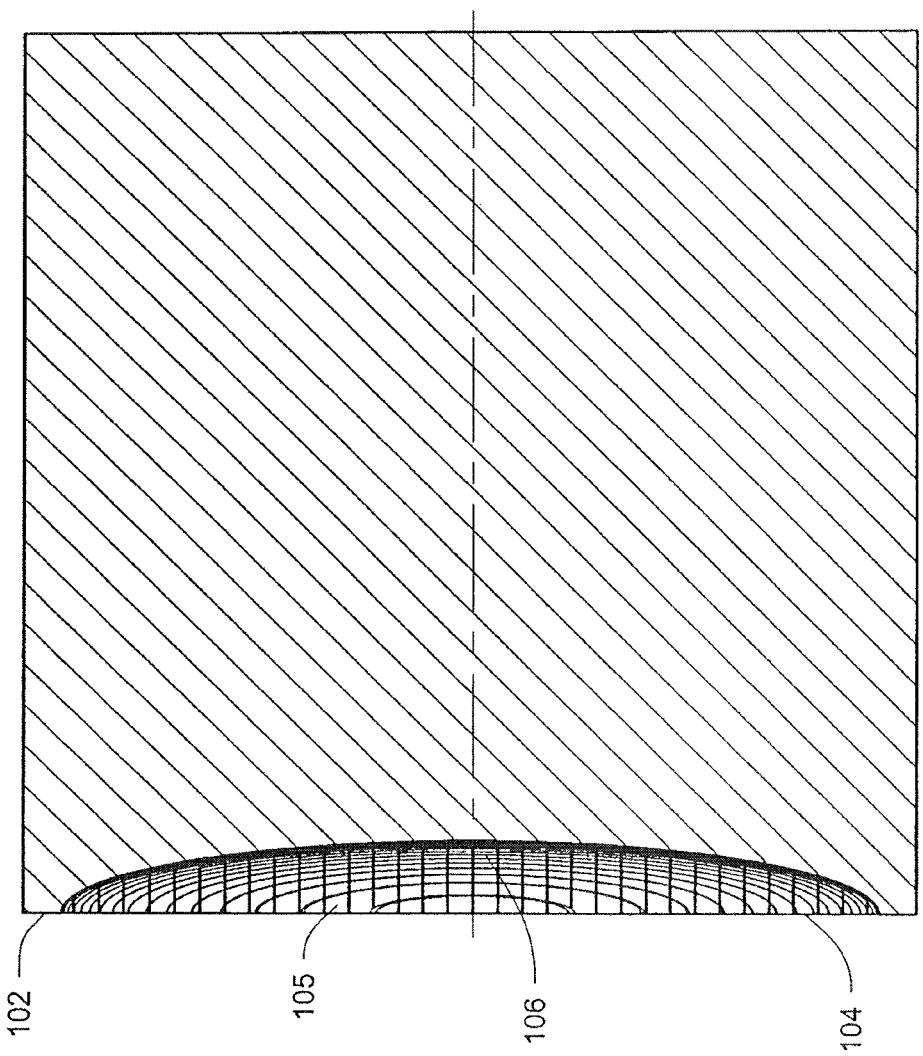
FIG. 15 illustrates a side sectional view of the inlet face of FIG. 14.

FIGS. 14-15 show an inlet face 100 having an end surface 104 disposed on a substrate 102 at the inlet side of an aftertreatment device, such as a DOC. The end surface 104 extends inwardly and resembles a concave parabolic type flow-through 106 aftertreatment device. As with the other inlet faces described, the inlet face 100 does not reside in the same plane. Rather, the end surface 104 is non-planar and has a somewhat fractured arrangement. That is, the end surface 104 does not reside entirely in the same overall plane, such as when viewed from its profile. (See for example FIG. 15.) The inlet face 100 also includes a cellular structure 105 with multiple cells. As with the other cellular structures described, it will be appreciated the cellular structure 105 of inlet face 100 may also incorporate increased cell dimension principles as described. It further will be appreciated that the inlet face 100 may be employed in various aftertreatment devices other than a DOC.

Figure 16:
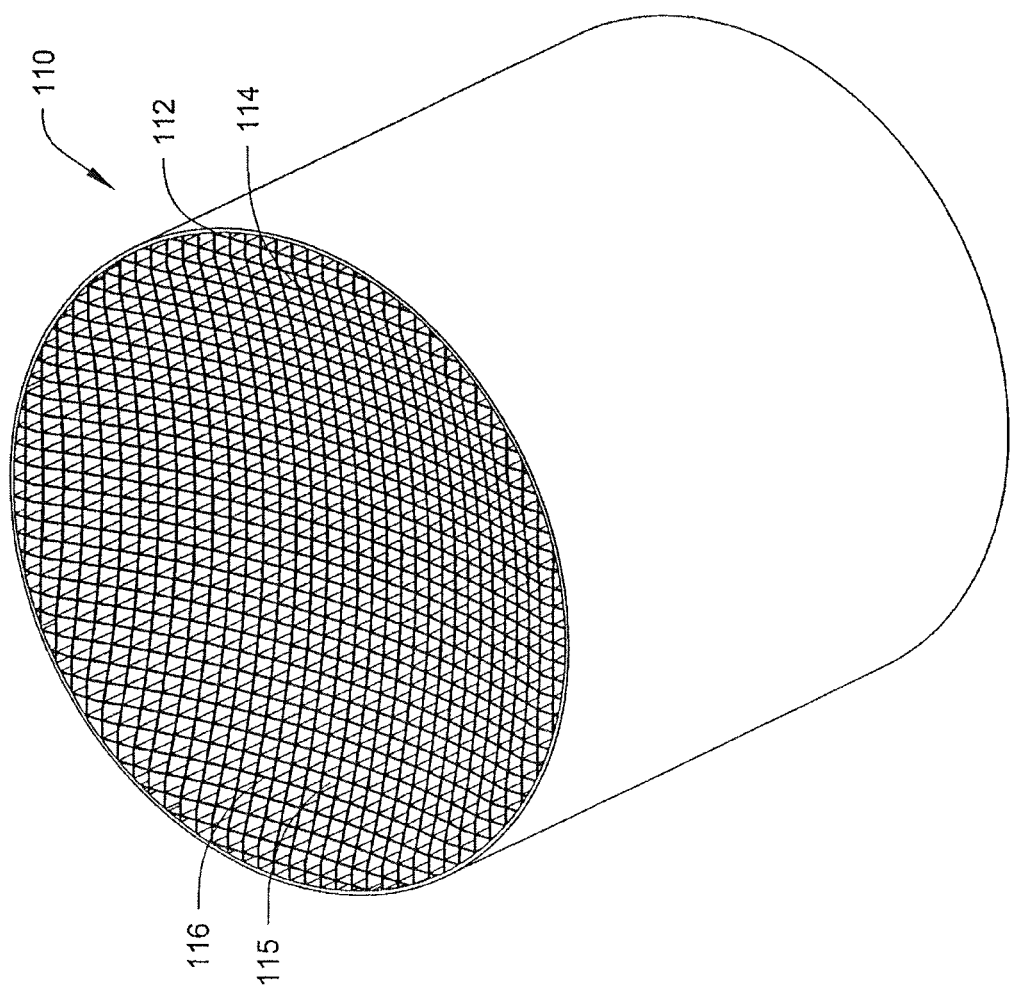
FIG. 16 illustrates a perspective view of yet another embodiment of an inlet face for an aftertreatment device.
Figure 17:
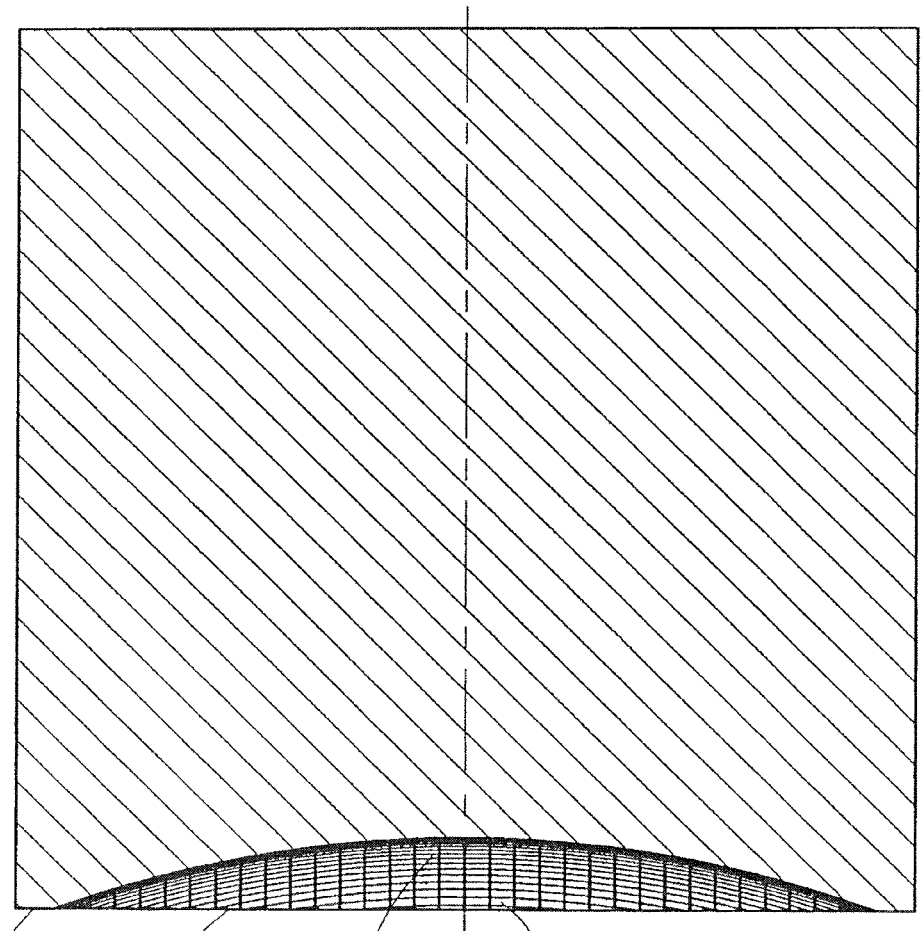
FIG. 17 illustrates a side sectional view of the inlet face of FIG. 16.

FIGS. 16-17 show an inlet face 110 having an end surface 114 disposed on a substrate 112 at the inlet side of an aftertreatment device, such as a DOC. The end surface 114 extends inwardly and resembles a concave rounded type flow-through 116 aftertreatment device. As with the other inlet faces described, the inlet face 110 does not reside in the same plane. Rather, the end surface 114 is non-planar and has a somewhat fractured arrangement. That is, the end surface 114 does not reside entirely in the same overall plane, such as when viewed from its profile. (See for example FIG. 17.) The inlet face 110 also includes a cellular structure 115 with multiple cells. As with the other cellular structures described, it will be appreciated the cellular structure 115 of inlet face 110 may also incorporate increased cell dimension principles as described. It further will be appreciated that the inlet face 110 may be employed in various aftertreatment devices other than a DOC.

As some examples only, any of the three-dimensional topographical configurations may be disposed on the inlet side or end of a substrate by any one of the following of: (1) applying a surface having the desired three-dimensional topographical configuration on the substrate of the inlet; (2) machining the desired three-dimensional topographical configuration into the substrate of the inlet; or (3) forming the three-dimensional topographical configuration by any suitable means so as to dispose it onto the substrate. It will be appreciated that the manner in which the three-dimensional topographical surface is disposed on the inlet side of a substrate is non-limiting, as long as the surface can be put at the inlet side and at the end of the substrate.

The three-dimensional topographical surface structure of the inlets described herein can provide many benefits. In operation, such surfaces can produce a degree of turbulent flow at the inlet face and a shear force that would serve to help dislodge or prevent soot deposits. The surfaces described, for example in FIGS. 1-4 and 6-11, also can provide for faster heating on localized regions (i.e. the upper, sharp ridges of the V-shaped rows, the tips or pinnacles of the pyramids, or the raised surface portions in the convex configurations) of the inlet surface due to a effective reduction of thermal mass in the fractured surface structure, thus assisting light off of any catalytic coating that might applied at the inlet face (described below) of an aftertreatment device and likewise any catalytic coating that is applied to the interior of an aftertreatment device.

As another particular benefit, the convex configurations shown in FIGS. 6-11 can further provide an inlet face with faster heating capability. Such configurations can facilitate preventing and/or eliminating larger carbonaceous fouling deposits from clogging the inlet face (i.e. soot deposits), such as may be released from the inner surface of an exhaust down pipe. For example, in turbo exhaust applications these larger soot deposits or "flakes" may break or crack off the inner surface of an exhaust down pipe after a critical thickness has accumulated (i.e. about a millimeter thickness). These flakes can deposit on the inlet face thereby causing cells in the cellular structure to be bridged with soot. However, such convex configurations as FIGS. 6-11 can further prevent this bridging.

Coating of an Inlet Face

In yet another embodiment, an inlet face includes an end surface, which is configured to prevent and/or eliminate face-plugging on the substrate. The end surface is provided with a chemical coating applied to an outer surface at the end of the substrate and including outer end portions of the substrate's cellular structure. As one example only, the chemical coating is useful for an inlet face of an aftertreatment device in reducing carbonaceous fouling, or more generally fouling, on the inlet face of the substrate. As with the three-dimensional topographical configurations described, it will be appreciated that the applied chemical coating may be suitably employed in various aftertreatment devices such as, but not limited to, a close-coupled catalyst (CCC), a diesel oxidation catalyst (DOC), a $NO_x$ adsorber catalyst (NAC), a selective catalytic reduction (SCR) catalyst, a catalyzed soot filter (CSF), or a diesel particulate filter (DPF).

The chemical coating may be at least one of a ceramic washcoat or a glass-based coating, or chemical solution, or other carrier suitable for applying the chemical coating. In one embodiment, such a chemical coating includes a material that is at least one selected from the group consisting of a catalytic precious metal, a catalytic precious metal oxide, a non-catalytic precious metal, a catalytic base metal, and a catalytic base metal oxide. In one embodiment, the chemical coating is an elevated loading at the inlet side and at the end of the substrate, for example an aftertreatment device. That is, the meaning of elevated loading is that the inlet face (or end) of the substrate (i.e. aftertreatment device) includes an increased amount of chemical coating at the end of the substrate than an amount of chemical coating that may be employed within the fluid passageways (channels) inside a aftertreatment device.

For example, the application of a chemical coating contains an elevated loading of catalytic precious metals (such as platinum (Pt) or palladium (Pd)), or base metals (such as vanadium (V)), or base metal oxides (such as vanadium pentoxide or cerium oxide), or other compounds (such as barium carbonate $BaCO_3$).

As one example only, the elevated loading can be in the range of about 80-120 g/ft^3. It will be appreciated that the amount of an elevated loading is meant to be non-limiting and may include various amounts as suitable and/or necessary to achieve the desired effect of preventing and/or eliminating face-plugging.

As a further example, a glass-based coating is applied to the inlet face, and may also contain an elevated loading of catalytic precious metals (such as platinum (Pt) or palladium (Pd)), or base metals (such as vanadium (V)), or base metal oxides (such as vanadium pentoxide or cerium oxide), or other compounds (such as barium carbonate $BaCO_3$). In one embodiment, the glass-based coating also contains potassium K. In such a configuration, the catalytic activity of the coating can help to prevent and/or eliminate soot deposits on an inlet face of an aftertreatment device. Additionally, an advantage may arise in which the glass coating can easily applied to the inlet face, and may provide for better filling-in or obstruction of microscopic pores and other asperities on the outer exposed portions of wall edges of the cells.

As noted, the meaning of elevated loading is that the coating is directly and deliberately applied at the inlet surface. An elevated loading is an increased amount of chemical coating disposed at the inlet surface or end of the substrate relative to an amount which may be used inside and beyond the inlet face. That is, the chemical coating may be applied as an extension of any coating present inside and beyond the inlet face. In the example of an aftertreatment device, the elevated loading includes an increased amount of chemical coating at the inlet face, which is more than what is typically employed within the channels throughout a catalyzed aftertreatment device.

Application of the chemical coating can include, for example, the free walls and edges of the cellular structure at the outer surface of the inlet and at the end of the substrate. In one embodiment, the chemical coating is directly and deliberately applied on the inlet face on the outer end surfaces of the cellular structure of the substrate. That is, the chemical coating can act as an extension of any coating that may be applied inside the fluid passageways of the substrate, and beyond the inlet face and end of the substrate. It further will be appreciated that the disposition of the chemical coating is not limited, so long as the chemical coating is applied to the inlet face.

It will be appreciated that in some cases, the chemical coating intentionally applied to the inlet face or end of the substrate may also unintentionally and incidentally be coated inside the fluid passageways. However, it will be appreciated that in the case of inlet face coating the chemical coating is intentionally applied at the end of the substrate on the outer end surfaces of the cellular structure, and is not intended to be applied within the fluid passageways of the substrate.

As another alternative, the coating may be applied to fill in any rough surfaces or asperities of the wall edges of a cell, and the coating would not extend into the flow passages of the substrate. In such a configuration, the surface area of the wall edges coated can further prevent carbonaceous fouling, such as the mechanical adhesion of soot/coke, by providing a surface that is less rough (or more smooth) as a result of the applied coating. As one example only, the coating may be applied at a thickness of about no more than a few thousandths of an inch to achieve such minimized cell surface asperities.

Figure 20:
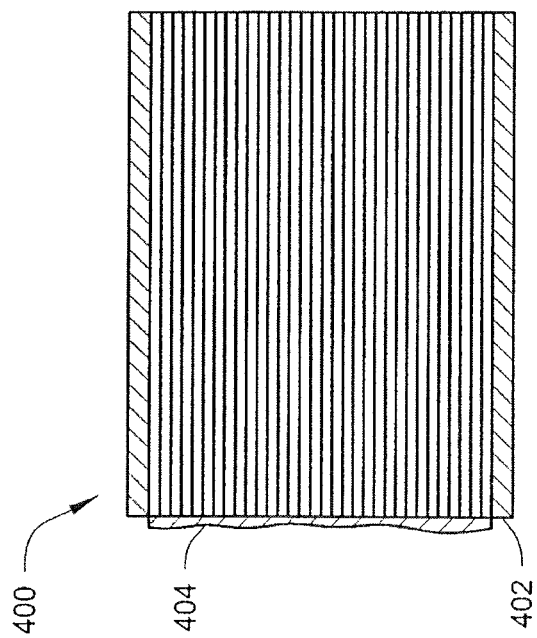
FIG. 20 illustrates a schematic side sectional view of one embodiment for the disposition of a chemical coating on an inlet face.

FIG. 20 illustrates a schematic side sectional view of one embodiment for the disposition of a chemical coating 404 on an inlet face 400. As shown, application of the chemical coating 404 is applied on the outside surface of the cellular structure 402 on the inlet face. That is, the coating 404 is applied such that it is a covering the outer surface at the end of the substrate, which does not extend into the interior of the cells or channels of the substrate. The coating 404 would be applied to only the wall and edge surfaces 402 of the inlet face 400 that face outward. As shown, the coating 404 is applied to a planar configuration of the end of the substrate. It will be appreciated that such a coating configuration can be combined with any of the three-dimensional topographical configurations discussed in FIGS. 1-17, as long as the coating is disposed on the outer surface as a covering on any three dimensional topographical configuration employed.

Figure 21:
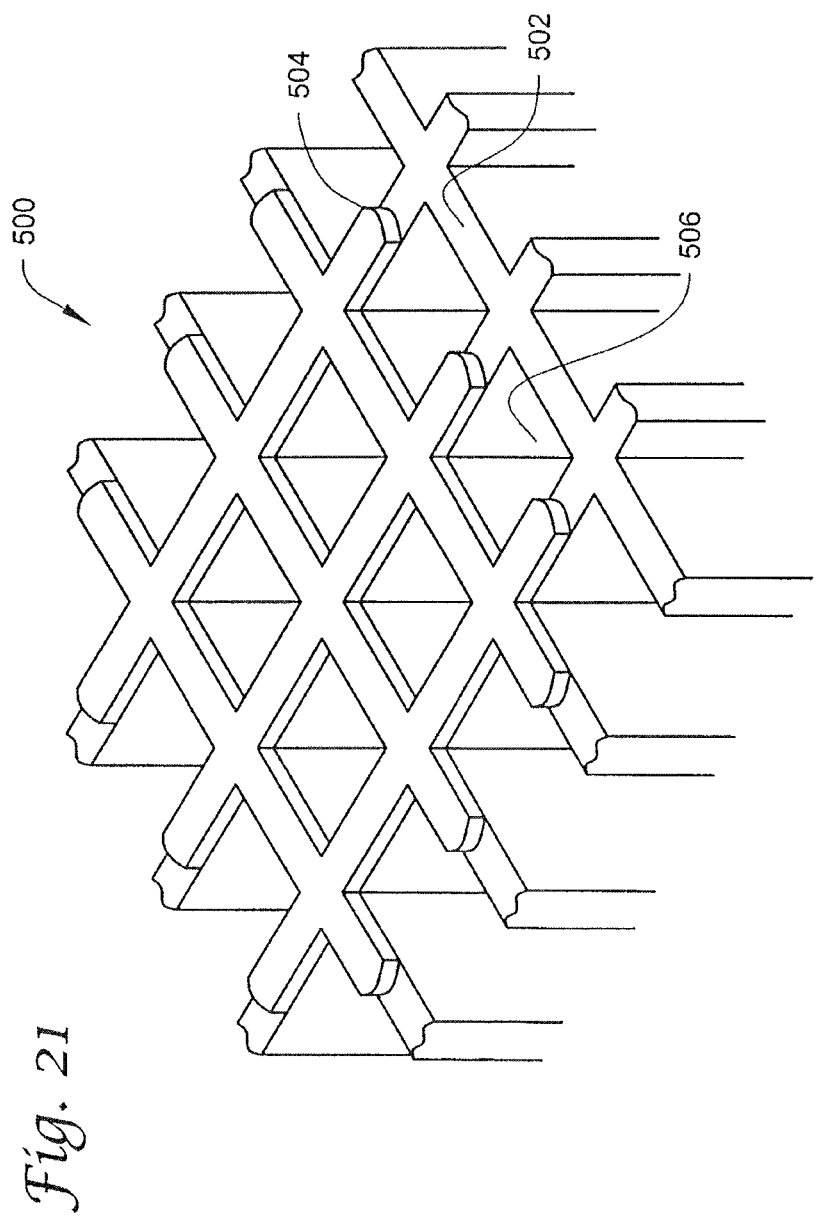
FIG. 21 illustrates a schematic perspective plan view of one embodiment for the disposition of a chemical coating on an inlet face.

FIG. 21 illustrates a schematic perspective plan view for the disposition of a chemical coating 504 on an inlet face 500. As shown, application of the chemical coating 504 is applied on the outside surface of the cellular structure 502 and on the inlet face. As in FIG. 20, the coating 504 is applied such that it covers the outer surface at the end of the substrate, and which does not extend into the interior of the cells or channels 506 of the substrate. The coating 504 would be applied to only the wall and edge surfaces of the cellular structure 502 that face outward from the end of the substrate. As shown, the coating 504 is applied to a planar configuration of the end of the substrate. It will be appreciated that such a coating configuration can be combined with any of the three-dimensional topographical configurations discussed in FIGS. 1-17, as long as the coating is disposed on the outer surface as a covering on any three dimensional topographical configuration employed. In FIG. 21, the coating 504 is illustrated as not covering the entire end surface of the cellular structure 502 for purposes of showing the disposition of the coating on the end of the substrate. However, it will be appreciated that the coating 504 would substantially cover the end of the substrate.

It will be appreciated that the coating is not limited to a specific formulation, as long as the coating is formulated to prevent carbonaceous fouling at the exposed edges of the cellular structure at the inlet face. That is, it will be appreciated that the chemical coating may be formulated to further a selective catalyst reaction, so as to further the function of preventing, eliminating and/or reducing inlet face-plugging.

As with the three-dimensional surface configuration, the coatings described can eliminate the need to build separate mechanisms for face-plugging detection and cleaning into the controls of an exhaust aftertreatment system.

As another example only, multiple NO to $NO_2$ turns ($NO_x$ turns) at the inlet face can advantageously result due to the elevated loading of the chemical coating, and can be further enhanced as a result of employing any of the three-dimensional topography configurations discussed above. That is, the resulting coating and turbulent flow can enhance the $NO_2$ driven oxidation of hydrocarbon and/or soot, presented to or deposited on the inlet face. Below is one illustration of the reaction mechanism in the presence of the precious metal catalyst, platinum Pt.

In one embodiment, the multiple $NO_x$ turn reactions can occur in the exhaust stream of a diesel engine that employs the described inlet face coating on an inlet of an aftertreatment device. The reaction over a catalyst (e.g. Pt) of NO with excess oxygen to produce $NO_2$ is:

$$NO + 1/2 O_2 \rightarrow NO_2 \quad \quad 1)$$

This $NO_2$ is subsequently used to oxidize carbon soot accumulated on the inlet face of the aftertreatment device through the following reactions:

For carbon soot:

$$2NO_2 + C \rightarrow CO_2 + 2NO \quad \quad 2)$$

$$NO_2 + C \rightarrow CO + NO \quad \quad 3)$$

The NO created by reactions (2) and/or (3) can again be oxidized at the inlet face of the aftertreatment device to form $NO_2$ via reaction (1) which will then proceed through reactions 2 and 3 repetitively until the carbon soot is consumed. This is called a "$NO_x$ turn."

For unburned hydrocarbon (HC) adsorbed on the soot, it is considered that the following catalyzed reactions (4) and (5) may also occur, essentially producing a drier soot accumulation that does not easily stick to the inlet face of the aftertreatment device. Furthermore, the thermal energy created by burning the HC on the additional catalyst (or elevated loading of catalyst) at the inlet face will help oxidize (i.e. burn) the accumulated soot.

$$C_yH_n + (1+n/4)O_2 \rightarrow yCO_2 + n/2 H_2O \quad \quad 4)$$

$$CO + 1/2 O_2 \rightarrow CO_2 \quad \quad 5)$$

In the above examples, reactions (1), (4) and (5) are catalyzed by a catalyst such as Pt. It will be appreciated, however, that while the reactions and resulting products may be somewhat different for catalysts other than Pt, the same principles apply in using a suitably formulated coating to react with the exhaust materials and thereby prevent coking/adhesion of soot at the inlet face.

Figure 18:
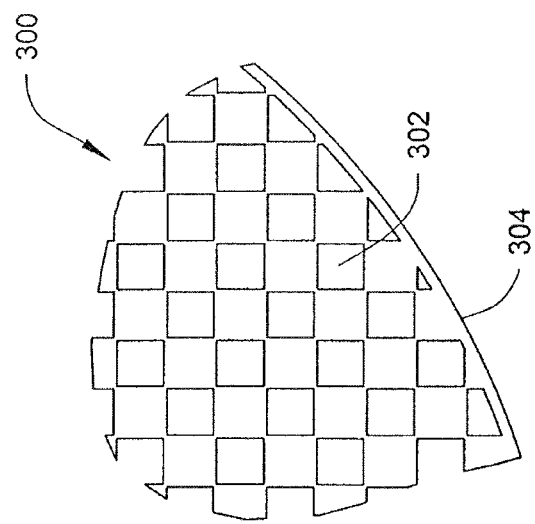
FIG. 18 illustrates a partial elevated view of one embodiment of a cellular structure for an inlet face.
Figure 19:
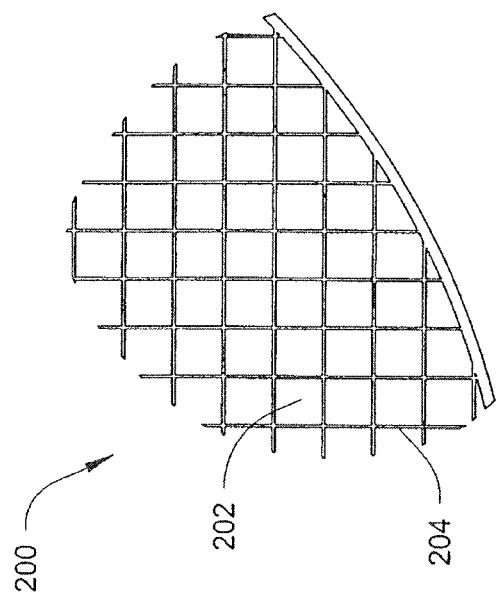
FIG. 19 illustrates a partial elevated view of another embodiment of a cellular structure for an inlet face.

As with the three-dimensional topographical surface configurations described above, any of the described coating embodiments may be applied to the cellular structures already described and at the inlet face of a substrate. FIGS. 18-19 illustrate separate embodiments of cellular structures for an inlet face. In one embodiment, a cellular structure 200 is configured such that the cells 202 are adjacent each other, and would be disposed substantially about an inlet face. The cellular structure 200 has some similarity with the illustrations of FIGS. 1-4 and 6-17. As described, inlet surface 200 may include about 100 to about 900 cells per square inch on the inlet face. The sidewalls 204 of each cell 202 may include a first pair of parallel walls and a second pair of parallel walls orthogonal to the first pair of parallel walls.

FIG. 19 illustrates a cellular structure 300 in which portions of the cellular structure 300 are plugged. As shown, the cellular structure 300 includes cells 302 and plugged portions 304 arranged in a "checker-board like" configuration, such that portions other than sidewalls (i.e. sidewalls 204 of cellular structure 200) of the cellular structure are blocked. It will be appreciated that the cellular structures 200, 300 are merely exemplary and are not limited to the specific configurations shown, as long as the cellular structure can incorporate any of the three-dimensional topographical surface configurations and/or any of the chemical coating embodiments described.

Experimental Results

Some of the above have been tested in a modified DOC on an engine and showed favorable results with additional Pt catalyst applied to the inlet face. After several test cycles on the engine, the inlet face-catalyzed DOC did not plug with soot. Also, the described topographical modifications to the inlet face appeared to have a positive effect under some engine operating conditions, by creating turbulence and localized heating on the inlet.

However, a standard DOC, which had no additional catalyst on the inlet face or a modified topographical configuration, was significantly face plugged with soot.

It will be appreciated, however, that the reactions and resulting products may be somewhat different for catalysts used other than Pt.

Other experiments have been conducted at the Cummins Technical Center, in which ultra low sulfur diesel (ULSD) fuel was dripped on an inlet composed of 420F stainless steel disks coated with vanadium metal at a temperature of approximately 220° C. The experiments showed that the resulting carbon deposits do not adhere to the vanadium surface.

Another experiment using a platinum metal rather than a vanadium metal surface yielded identical results. It is expected that a ceramic washcoat which is highly loaded with precious metals such as a Pt and/or Pd oxide would exhibit similar results. In yet another example, a ceramic washcoat containing cerium oxide may also be employed under certain temperature conditions. In still another example, it would be appreciated that an SCR-like catalyst washcoat, such as one containing vanadium pentoxide, iron zeolite or copper zeolite, also may be used and can produce a similar effect.

The inlet structure described can provide many benefits. By employing a non-planar, three-dimensional topographical configuration and/or chemically modified inlet face, face-plugging can be prevented and/or eliminated. In one preferred example, such a structure is useful for preventing the deposition of soot on the inlet face of an aftertreatment device, such that the soot does not bridge and thus plug normally open channels through which exhaust gases flow under typical engine/aftertreatment system operating conditions.

Such a beneficial inlet face structure may be useful in various applications. As some non-limiting examples only, the inlet face structure may be employed in the exhaust stream of vehicular or automotive engines, diesel engines, marine engines and equipment, industrial power generators, equipment used in industrial processes, or any other equipment that employ aftertreatment devices or that use fuels generating coking material.

The invention may be embodied in other forms without departing from the spirit or novel characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

The invention claimed is:

1. A method for preventing and/or eliminating face-plugging on an inlet of an aftertreatment device comprising:
forming a substrate having an end and an interior with a cellular structure that is configured to enable fluid flow through the substrate;
disposing an end surface on the end of the substrate and on outer surfaces of the cellular structure located at the end of the substrate, the end surface including an amount of a chemical coating that is configured to prevent and/or eliminate face-plugging on the substrate and cellular structure; and
wherein the disposing the surface on the substrate further comprises at least one of: applying the amount of the chemical coating on the outer surface at the end of the substrate and on outer surfaces of the cellular structure present at the end of the substrate without the amount of chemical coating extending into the interior of the substrate; and applying the chemical coating on a three-dimensional topographical configuration on the end of the substrate without the amount of the chemical coating extending into the interior of the substrate, such that the chemical coating faces outward from the end of the substrate.

2. An aftertreatment device comprising:
a substrate including an end having a cellular structure defining an interior of the substrate that is configured to enable fluid flow through the substrate, the cellular structure being an inlet face disposed at the end of the substrate;
an end surface disposed on the end of the substrate and on outer surfaces of the cellular structure located at the end of the substrate, the end surface including a chemical coating applied in an amount configured to prevent and/or eliminate face-plugging on the substrate, wherein the chemical coating is
at least one of: applied on the outer surface at the end of the substrate without the amount of the chemical coating extending into the interior of the substrate and applied on a three-dimensional topographical configuration disposed on the end of the substrate without the amount of the chemical coating extending into the interior of the substrate.

3. The aftertreatment device of claim 2, wherein the three-dimensional topographical configuration comprises a plurality of adjacent v-shaped parallel rows.

4. The aftertreatment device of claim 2, wherein the three-dimensional topographical configuration comprises a first plurality of adjacent v-shaped parallel rows and a second plurality of adjacent v-shaped parallel rows that are orthogonal to the first plurality of adjacent v-shaped rows, such that the first and second plurality of adjacent v-shaped rows are configured as a multiple four-sided pyramid-like arrangement.

5. The aftertreatment device of claim 2, wherein the three-dimensional topographical configuration is applied onto the end of the substrate or is machined into the end of the substrate.

6. The aftertreatment device of claim 2, further comprising one of a diesel oxidation catalyst and a close-coupled catalyst, and wherein the one of the diesel oxidation catalyst and the close-coupled catalyst includes the substrate.

7. The aftertreatment device of claim 2, further comprising a filter including the substrate.

8. The aftertreatment device of claim 7, wherein the filter comprises at least one filter selected from the filters consisting of a soot filter, a catalyzed soot filter, and a diesel particulate filter.

9. The aftertreatment device of claim 2, further comprising one of a NOx adsorption catalyst and a selective reduction catalyst, and wherein the one of the NOx adsorption catalyst and the selective reduction catalyst includes the substrate.

10. An apparatus for preventing face plugging an inlet of an aftertreatment device, the apparatus comprising:
a substrate including an end and an interior having a cellular structure configured to enable fluid flow through the substrate, the cellular structure being an inlet face disposed at the end of the substrate; and
an end surface disposed on the end of the substrate and on outer surfaces of the cellular structure located at the end of the substrate, the end surface comprising a chemical coating in an amount that is configured to prevent face-plugging on the substrate, wherein the amount of the chemical coating does not extend into the interior of the substrate.

11. The apparatus of claim 10, wherein the end surface further comprises a three-dimensional topographical configuration disposed on the end of the substrate.

12. The apparatus of claim 10, wherein the aftertreatment device comprises at least one of a diesel oxidation catalyst and a catalyzed soot filter, and wherein the amount of the chemical coating comprises an elevated loading of a chemical coating employed within interior of the substrate.

13. The apparatus of claim 10, wherein the amount of the chemical coating comprises an elevated loading of one of precious metals and base metal oxides disposed within the interior of the substrate.

14. The apparatus of claim 13, wherein the elevated loading comprises a loading value between 80 and 120 g/ft$^3$ inclusive.

15. The apparatus of claim 10, wherein the chemical coating is a glass based coating.

16. The apparatus of claim 15, wherein the amount of the chemical coating further comprises an elevated loading of at least one material selected from the materials consisting of: a precious metal, Pt, Pd, a base metal oxide, vanadium pentoxide, cerium oxide, vanadium, and $BaCO_3$, wherein the at least one material is disposed within the interior of the substrate.

17. The apparatus of claim 15, wherein the glass based coating further comprises K.

* * * * *